United States Patent
Schwartz et al.

(10) Patent No.: US 12,012,128 B2
(45) Date of Patent: Jun. 18, 2024

(54) OPTIMIZATION BASED PLANNING SYSTEM

(71) Applicant: Zoox, Inc., Foster City, CA (US)

(72) Inventors: Jeremy Schwartz, Redwood City, CA (US); Prateek Chandresh Shah, San Francisco, CA (US)

(73) Assignee: ZOOX, INC., Foster City, CA (US)

( * ) Notice: Subject to any disclaimer, the term of this patent is extended or adjusted under 35 U.S.C. 154(b) by 362 days.

(21) Appl. No.: 17/485,041

(22) Filed: Sep. 24, 2021

(65) Prior Publication Data

US 2023/0097121 A1    Mar. 30, 2023

(51) Int. Cl.
*B60W 60/00*     (2020.01)
*G05B 13/02*     (2006.01)
*G06N 20/00*     (2019.01)

(52) U.S. Cl.
CPC .... *B60W 60/0027* (2020.02); *B60W 60/0011* (2020.02); *G05B 13/0265* (2013.01); *G06N 20/00* (2019.01); *B60W 2540/20* (2013.01); *B60W 2554/4041* (2020.02)

(58) Field of Classification Search
CPC ......... B60W 60/0027; B60W 60/0011; B60W 2554/4041; B60W 2540/20; G06N 20/00; G05B 13/0265
USPC .......................................................... 701/26
See application file for complete search history.

(56) References Cited

U.S. PATENT DOCUMENTS

| | | | |
|---|---|---|---|
| 10,579,063 B2 * | 3/2020 | Haynes | G01S 13/931 |
| 10,671,076 B1 * | 6/2020 | Kobilarov | G08G 1/166 |
| 11,203,362 B1 * | 12/2021 | Beijbom | B60W 60/0011 |
| 2015/0266475 A1 * | 9/2015 | Tanzmeister | B60W 30/0956 |
| | | | 701/300 |
| 2019/0354111 A1 * | 11/2019 | Cheng | G05D 1/0027 |
| 2020/0110416 A1 * | 4/2020 | Hong | G01C 21/3602 |
| 2020/0387158 A1 | 12/2020 | Kobilarov | |
| 2021/0200212 A1 | 7/2021 | Urtasun | |

FOREIGN PATENT DOCUMENTS

EP    3730384 A1    10/2020

OTHER PUBLICATIONS

PCT Search Report and Written Opinion dated Dec. 16, 2022 for PCT Application No. PCT/US22/42788, 12 pages.

* cited by examiner

*Primary Examiner* — Hunter B Lonsberry
*Assistant Examiner* — Helen Li
(74) *Attorney, Agent, or Firm* — Lee & Hayes P.C.

(57) ABSTRACT

Techniques for aggregating costs associated with one or more heat maps to control a vehicle in an environment are discussed herein. A vehicle computing device can implement a model to determine heat maps and respective cost information for different features of the environment based on sensor data. The vehicle computing device can output a planned trajectory for the vehicle based on combining the heat maps. The techniques can also include determining a rationalization or root cause detailing reasons why the planned trajectory was determined.

20 Claims, 6 Drawing Sheets

OPTIMIZATION BASED PLANNING SYSTEM

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
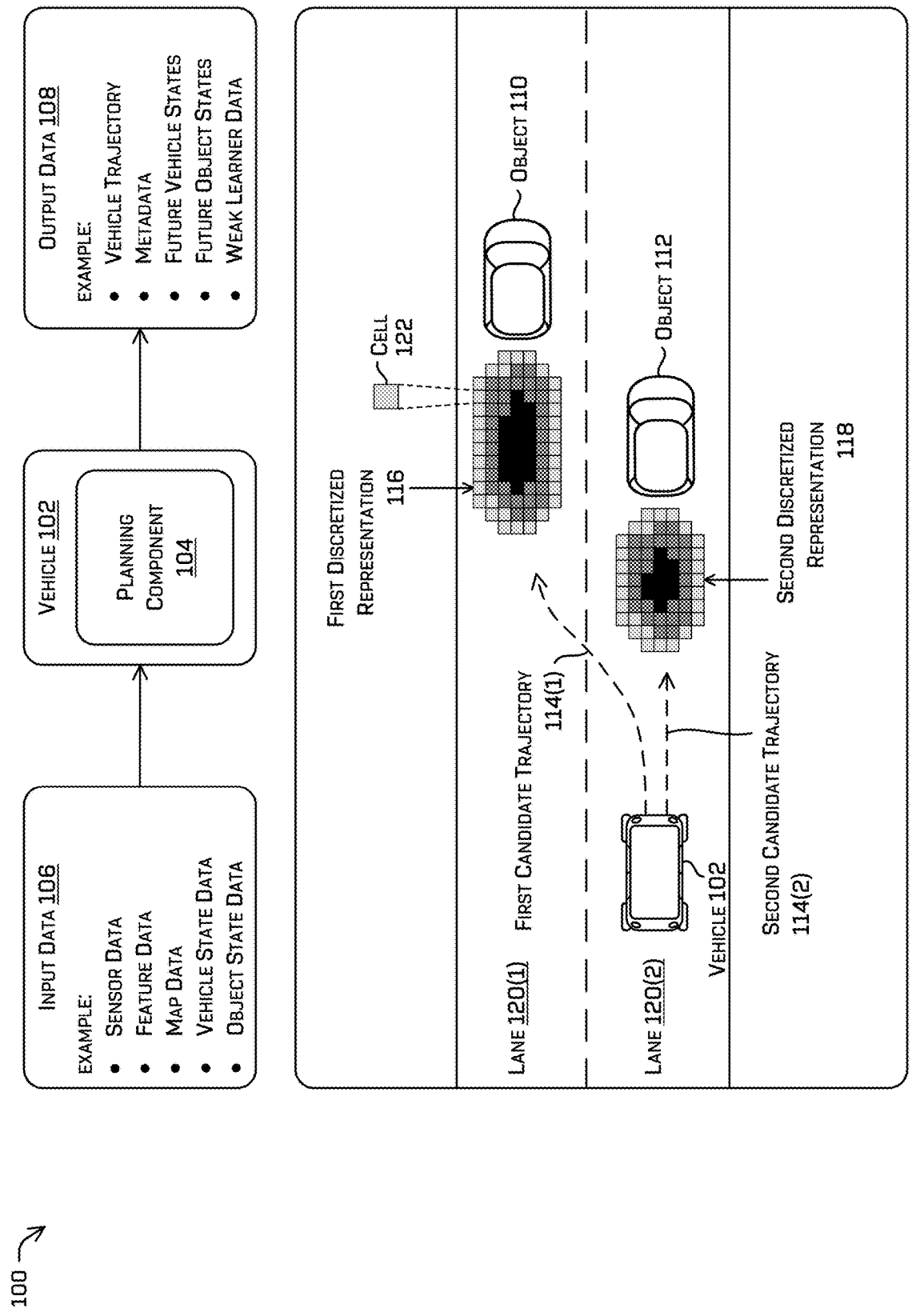
FIG. 1 is an illustration of an example environment, in which an example vehicle applies a planning component to predict a vehicle trajectory.

This application describes techniques for aggregating costs associated with one or more heat maps to control a vehicle in an environment. For instance, a vehicle computing device can implement a model to determine heat maps and respective cost information for different features of the environment based on sensor data. The vehicle computing device can combine the heat maps and associated costs to output a planned trajectory for the vehicle and metadata indicating information about the vehicle and/or the environment (e.g., circumstances relating to the planned trajectory). The model can receive feature information describing vehicle safety, a vehicle state, an object state, and/or a control policy, and generate a heat map for each feature included in the future information. The model can aggregate the costs associated with the different features using a heuristic, a tree search, and/or a mathematical algorithm. Using the techniques described herein, a vehicle may receive the planned trajectory and the metadata usable by the vehicle to quickly and/or preemptively avoid objects, thereby improving safety of the vehicle. Further, techniques can include determining a rationalization or root cause detailing reasons why a planned trajectory was determined.

Generally, the techniques described herein enable an autonomous vehicle to safely plan for scenarios such as potential interactions with objects (e.g., a vehicle, a pedestrian, a bicyclist, etc.), traffic sign interactions, etc. The model can determine an action (e.g., a braking action, an acceleration action, a trajectory, etc.) for the autonomous vehicle based on applying a heuristic to combined costs of a heat map. The model outputs metadata to provide reasons why the action was determined (e.g., provides an indication of what the vehicle is doing at the time the action is determined). In other words, the model determines metadata (also referred to as interpretability data) to provide context of the environment and the autonomous vehicle at the time the trajectory is determined. In this way, the model can provide "situational awareness" to safely navigate the autonomous vehicle in the environment.

In some examples, a planning component of the vehicle computing device can implement the model to combine costs associated with different features in a variety of ways. For instance, the model can receive sensor data representing the environment and feature data associated with a region in the environment and/or a control policy for the vehicle (e.g., stay in lane, change lane, operate blinker, brake, accelerate, and so on). The model can, in some examples, determine a heat map for some or all of the features in the feature data based on the sensor data. Each heat map can be associated with a set of costs, and the model can combine the sets of costs of the heat maps using a heuristic and/or an algorithm. For example, the model can perform a tree search of the combined costs to determine the planned trajectory for the vehicle in the future. In some examples, the model may apply a heuristic to the tree search to cause different amounts of processing for branches associated with different features and/or potential trajectories. In various examples, the model can perform the tree search of the costs (e.g., follow cost, lane change cost, blinker cost, progress cost, safety cost, obstacle cost, interaction cost, etc.) to select or otherwise determine the planned trajectory from a set of trajectories.

The vehicle computing device can control the vehicle in the environment based at least in part on an output from the model (e.g., a planned trajectory, metadata). For example, the vehicle computing device can detect object(s) in the environment and use the combined heat maps to control an action of the vehicle, such as determining a trajectory for the vehicle or otherwise causing the vehicle to traverse the environment. For instance, controlling the vehicle may comprise stopping the vehicle and/or controlling at least one of: a braking system, an acceleration system, or a drive system of the vehicle.

As mentioned above, the model can output metadata representing an intent of the vehicle and/or characteristics of the environment (e.g., what the vehicle is doing relative to the selected trajectory). The metadata can indicate an action or behavior by the vehicle (e.g., "continue to follow vehicle", "stay in lane", etc.) along the planned trajectory. In some examples, the metadata can describe a vehicle position, an object position, vehicle state data, object state data, rules of the road data (e.g., traffic permission rules), during the time that the model determines vehicle trajectory(ies). In some examples, determining metadata by the model can include annotating cost information (e.g., costs associated with the heat maps) with the metadata. By outputting the metadata, the vehicle can predict potential interactions with objects in the environment similar to how a human operator interprets surroundings when deciding an action while driving.

In some examples, the model can output the metadata for presentation on a display device such as a user interface within the vehicle (e.g., to show or explain actions by the vehicle to a passenger of the vehicle). For example, outputting the metadata by the model can include presenting an indication of a route, a trajectory, and/or characteristics of the environment to a rider of an autonomous vehicle. In this way, the passenger (or other observer) can see the reasons the vehicle computing device is taking a current action relative to one or more objects. For example, the vehicle may present images of another vehicle, pedestrian, etc. sensed in the vicinity of the autonomous vehicles to give the passenger context for current and future vehicle operations.

The model can also or instead output the metadata for training the model. For example, a computing device can train the model based at least in part on the metadata describing reasons a vehicle trajectory is or is not selected for the vehicle to follow. For example, the metadata can describe details about the vehicle, the environment, and other objects for different candidate trajectories determined by the model. The model may determine to not use a first candidate trajectory based on the model determining that the costs for taking the first candidate trajectory are higher (a safety cost is too high, a following object cost is too high, etc.) than a second candidate trajectory usable as the planned trajectory. The computing device can use the metadata during training of the model to "understand" why the first candidate trajectory was not used as the planned trajectory as well as why the second candidate trajectory was selected by the model as the planned trajectory. Further, the metadata can be logged, presented on a display device to convey vehicle actions to a passenger, and/or used for debugging to improve determinations made during planning operations. Additional details of reporting actions by a vehicle is described in U.S. patent application Ser. No. 15/600,258, filed on May 19, 2017, entitled "Communicating Reasons for Vehicle Actions," which is incorporated herein by reference for all purposes.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a vehicle computing device in a number of ways. Performing numerous predictions for possible vehicle trajectories during planning considerations (e.g., trajectory determinations, calculations, etc.) can be extremely computationally expensive, particularly when there are numerous objects in an environment that may behave in infinitely unexpected ways. Utilizing trajectory data and metadata by a vehicle computing device as described herein can improve the accuracy and/or reduce a latency for the vehicle to respond to a potential collision in the environment. By considering multiple features and the associated costs, computational load to predict potential interaction between objects and the vehicle is reduced, thereby improving the functioning of the vehicle computing device. Thus, the techniques discussed herein may improve a functioning of the vehicle computing device by reducing computational resources (e.g., repurposing available computational resources) used to predict potential actions for objects in the environment of the vehicle.

The techniques discussed herein may also improve a functioning of a vehicle computing device by receiving predictions from a planning component that indicate reasons for determining a trajectory or other vehicle action. For instance, presenting reasons why a trajectory was determined by the planning component can improve passenger comfort and safety by enabling the passenger to see how the vehicle computing device is acting as a "safe driver". Furthermore, such techniques may be used, for example, to validate the safe operation of a vehicle. As a non-limiting example of such, highly complex optimizations may not provide insight into why a particular output was created. However, by performing the techniques herein, the safety of the system in responding to various scenarios may be validated. In addition, reasons for different vehicle actions output by the planning component can be used to improve accuracy of future predictions (e.g., improve debugging by identifying areas of costs which contributed to the output trajectory that should be modified). In some examples, the planning component can improve functioning and safety of the vehicle by preventing the vehicle from taking additional actions that are not required (e.g., avoiding sudden braking or swerving when not needed) based on evaluating specific reasons or conditions in the environment around the vehicle that led to a prediction.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Further, although discussed in the context of lidar data, the techniques can be applicable to any type of sensor data are not limited to specific examples discussed herein. Additionally, the techniques described herein can be used with real data (e.g., captured using sensor(s)), simulated data (e.g., generated by a simulator), or any combination of the two.

FIG. 1 is an illustration of an example environment 100, in which an example autonomous vehicle (vehicle 102) applies a planning component 104 to predict a vehicle trajectory. As illustrated, the planning component 104 receives input data 106 associated with the vehicle, the environment, and one or more objects, usable to determine output data 108. The output data 108 can represent a vehicle trajectory (e.g., a candidate trajectory, a planned trajectory, etc.) and/or metadata associated with the vehicle trajectory. In some examples, the planning techniques described herein may be implemented at least partially by or in association with a vehicle computing device (e.g., vehicle computing device 404 of FIG. 4) and/or a remote computing device (e.g., computing device(s) 436 of FIG. 4).

In various examples, a vehicle computing device associated with the vehicle 102 may be configured to detect one or more objects (e.g., objects 110 and 112) in the environment 100, such as via a perception component. In some examples, the vehicle computing device may detect the objects, based on sensor data received from one or more sensors (e.g., a lidar sensor, a radar sensor, a camera, etc.). In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like.

In some examples, the sensors may include one or more remote sensors, such as, for example sensors mounted on another autonomous vehicle, and/or sensors mounted in the environment 100. In various examples, the vehicle 102 may be configured to transmit and/or receive data from other autonomous vehicles (e.g., one or more autonomous vehicles in a fleet) and/or the sensors. The data may include sensor data, such as data regarding the objects detected in the environment 100. In some examples, the sensors may be mounted in the environment 100 to provide additional visibility in an area of reduced visibility.

In various examples, the vehicle computing device can receive the sensor data and can semantically classify the detected objects (e.g., determine an object type), such as, for example, whether the object is a vehicle such as the objects 110 and 112, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential actions by an object may be considered based on characteristics of the object (e.g., how the object may potentially move in the environment).

In addition to the sensor data, the input data 106 can also comprise one or more of: feature data, map data, vehicle state data, and object state data, just to name a few. The input data 106 may represent, for example, feature information describing vehicle safety, a vehicle state, an object state, and/or a control policy associated with the vehicle 102 (e.g., a lane change feature, a blinker operation feature, and so on). One or more features in the feature information can include information associated with a region (e.g., an area adjacent an object), the vehicle state (position, velocity, acceleration, trajectory, etc.), the object state (position, velocity, acceleration, trajectory, etc.), and/or a control policy (e.g., a policy that controls the vehicle to stay in a lane or maintain a distance between the vehicle 102 and another object). The input data 106 may include environmental features based on the map data and/or safety thresholds (e.g., a safety range) for a speed, an acceleration, a steering, and/or a braking action.

The planning component 104 can implement one or models to process the input data 106 to determine one or more vehicle trajectories such as a first candidate trajectory 114(1) and a second candidate trajectory 114(2). The planning component 104 can determine one of the candidate trajectories as the planned trajectory for the vehicle 102 to follow in the environment 100 relative to the objects 110 and 112. For instance, the planning component 104 can identify or otherwise determine one of the first candidate trajectory 114(1) or the second candidate trajectory 114(2) for the vehicle 102 to use at a future time based at least in part on performing a tree search or other decision tree technique.

In some examples, the planning component 104 can include determining one or more discretized representations including a first discretized representation 116 and a second discretized representation 118 based at least in part on the input data 106. For examples, the planning component 104 can generate the first discretized representation 116 and the second discretized representation 118 based at least in part on the sensor data and feature data representing a region behind an object (e.g., a first region behind the object 110 and a second region behind the object 112). As shown in FIG. 1, the first discretized representation 116 and the second discretized representation 118 represent respective heat maps for different regions of the environment. In various examples, the planning component 104 can determine a discretized representation, or heat map, for different features of the feature data.

In the illustrated example, the planning component 104 can determine whether the vehicle 102 uses the first candidate trajectory 114(1) to follow the object 110 in lane 120(1) or the second candidate trajectory 114(2) to follow the object 112 in lane 120(2). In some examples, the planning component 104 can implement a tree search to determine the first candidate trajectory 114(1) or the second candidate trajectory 114(2) as the planned trajectory for the vehicle 102 to follow in the future. For example, the planning component 104 can determine a first set of costs for the first candidate trajectory 114(1) and a second set of costs for the second candidate trajectory 114(2). In this example, the costs may be associated with branches of the tree, and the planning component 104 can output the planned trajectory based on selecting, identifying, or otherwise determining a branch of the tree having a combined cost that is less than a cost threshold, lowest cost, and/or any other metric. For instance, the planning component 104 can select, as the planned trajectory, the first candidate trajectory 114(1) or the second candidate trajectory 114(2) (or portions thereof) based at least in part on whether the first set of costs or the second set of costs are less than the cost threshold and/or which of the trajectories is associated with the lowest overall cost.

In the example in FIG. 1, the feature data represents a region feature, or an area behind an object. That is, the planning component 104 can generate a first heat map for following the object 110 and a second heat map for following the object 112 based on the feature data (e.g., identify an area for the heat map based on a feature type). While the objects 110 and 112 represent an additional vehicle, in other examples the vehicle 102 could use the planning component 104 for deciding whether to follow a pedestrian, a bicyclist, a moped, a motorcycle, and so on. As explained elsewhere herein, the planning component 104 can also or instead determine when to initiate a blinker, whether or not to change lanes, or whether to perform a stopping operation, turning operation, acceleration operation, just to name a few.

As illustrated in FIG. 1, the first discretized representation 116 and the second discretized representation 118 can comprise one or more cells (e.g., cell 122) representing costs for the vehicle 102 to occupy the respective cell. For instance, each heat map can be associated with a respective set of costs. Costs associated with the heat map can represent a weight for the vehicle 102 to occupy the cell relative to a feature (e.g., the feature data used to generate the heat map). In some examples, the heat map may be associated with an individual cost (e.g., a reference cost, obstacle cost, progress cost, lane change cost, etc.), and heat maps for different individual costs may be aggregated to determine a "final" heat map of costs for an instant in time. By way of example and not limitation, a reference cost for the vehicle 102 to occupy the lane 120(2) may be lowest in the center of the lane and may increase outward from the center of the lane. In addition, an obstacle cost may be associated with the object 112 (e.g., the obstacle cost may increase as the distance between the vehicle 102 and the object 112 decreases). In various examples, the planning component 104 can aggregate the costs (e.g., the reference cost, the obstacle cost, and other costs) to determine the "final" heat map which is usable to determine a vehicle action.

FIG. 1 shows shading in the first discretized representation 116 and the second discretized representation 118 to convey the cost value for each cell. For instance, darker shading may indicate a lower cost for the vehicle 102 to occupy the cell 122. In some examples, shading in FIG. 1 represents different costs associated with cells, which can change from time $T_1$ to $T_2$ depending at least in part upon a location of the vehicle 102 (and a new position of the associated sensors). In some examples, costs associated with cells can be based at least in part on accessibility of the cell to the vehicle, a size of the cell, and other factors as discussed herein. Additional detail for determining costs are discussed throughout this disclosure including in FIGS. 2 and 3.

In addition to vehicle trajectories and metadata, the planning component 104 can also output a state of the vehicle 102, a state of the object 110, and/or a state of the object 112 at one or more future times. That is, future vehicle states and future object states may be output to represent potential actions by the respective vehicle and object, such as by performing a simulation. In some examples, the vehicle computing device can control operation of the vehicle 102 based on the output data 108 while in other examples, the planning component 104 can send the output data 108 to another component or model of the vehicle computing device, or a remote computing device, to train model(s) of the planning component 104 to improve predictions. Training may include using the output data 108 as weak learner data (e.g., a weak classifier label) and/or ground truth. For instance, the weak classifier label can classify an aspect of vehicle behavior (e.g., an action associated with one or more trajectories) as good or bad, and a machine learned model can be trained based at least in part on the weak classifier label to determine whether subsequent vehicle behavior associated with a subsequent trajectory is good or bad.

The planning component 104 may determine the output data 108 using one or more models. For example, a first model can identify the metadata and a second model can determine the vehicle trajectory. Alternatively, a first model may determine the vehicle trajectory and the metadata based on receiving the input data 106 from a second model. In such examples, the second model may provide the first model with an intent of the vehicle 102, the object 110, and/or the object 112 (e.g., a predicted behavior of the vehicle and/or the object). For example, the first model can determine the planned trajectory from among multiple candidate trajectories based on the second model sending data indicating discrete actions or known behavior of the vehicle 102, the object 110, and/or the object 112.

In some examples, training a model of the planning component 104 can include comparing an intent of the metadata output by a first model with an intent or action output by a second model. For example, the first model can be trained to improve metadata descriptions by comparing a difference between the intent indicated by the metadata with the intent or the action output by the second model. In such examples, the planning component 104 can implement the first model and the second model in parallel, and use the output of the second model as ground truth for training an output of the first model. For instance, an output of the second model can be used to verify accuracy of the intent output by the first model.

Figure 2:
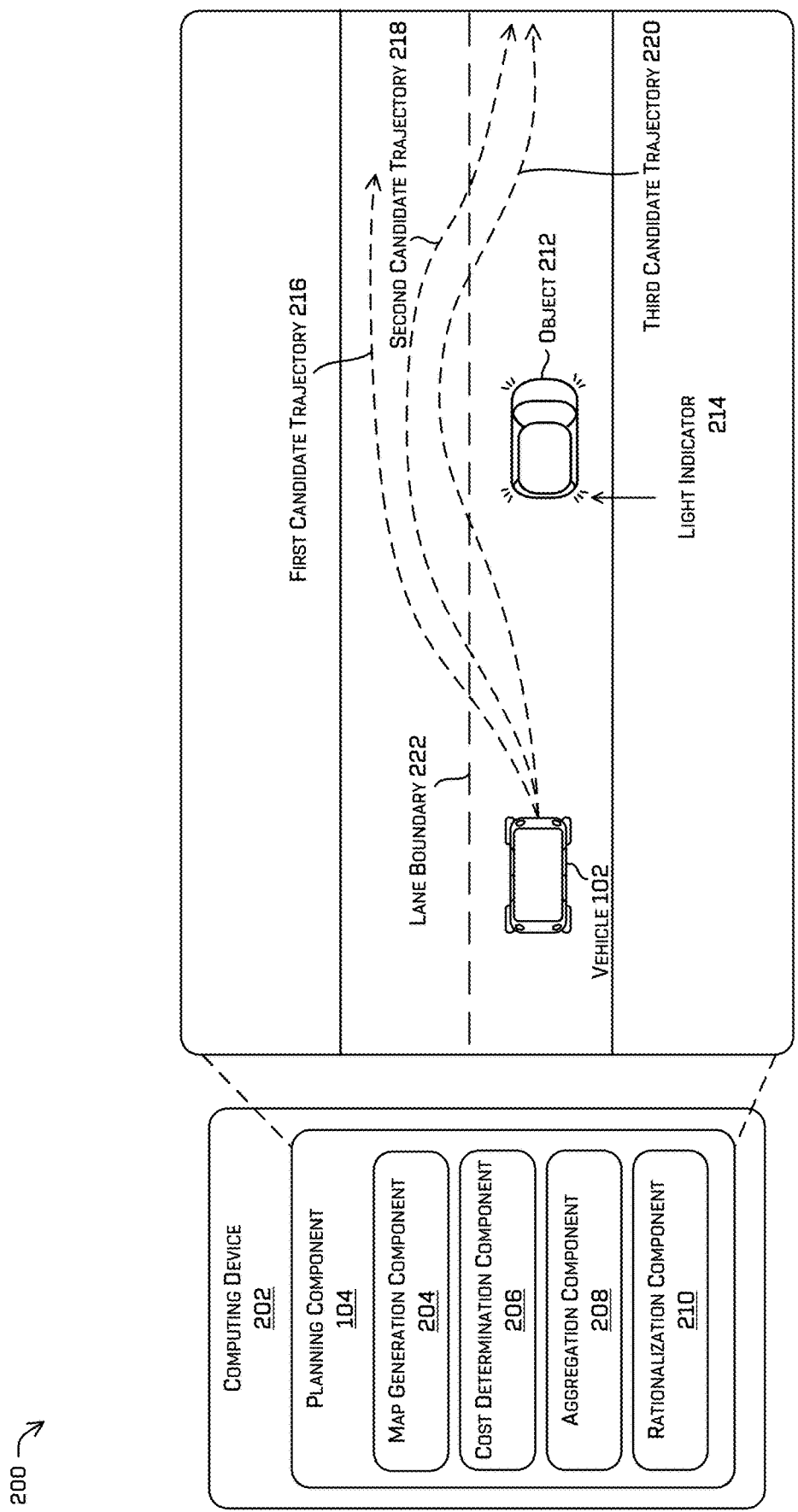
FIG. 2 is an illustration of another example environment, in which an example vehicle applies a planning component to predict a vehicle trajectory.

FIG. 2 is an illustration of another example environment 200, in which an example vehicle (vehicle 102) applies a planning component (the planning component 104) to predict a vehicle trajectory.

As illustrated, a computing device 202 comprises the planning component 104 which includes a map generation component 204, a cost determination component 206, an aggregation component 208, and a rationalization component 210. In some examples, the computing device 202 can comprise a vehicle computing device (e.g., vehicle computing device 404) and/or a remote computing device (e.g., computing device(s) 436). The planning component 104 can implement one or more of: the map generation component 204, the cost determination component 206, the aggregation component 208, and the rationalization component 210 to control the vehicle 102 relative to an object 212 with flashing lights (e.g., light indicator 214). For example, the computing device 202 can determine a first candidate trajectory 216, a second candidate trajectory 218, or a third candidate trajectory 220 to control when and where the vehicle 102 will cross a lane boundary 222 in the future.

In some examples, the computing device 202 can, for instance, select one of the determined trajectories as a planned trajectory based on processing the input data 106 associated with the environment 200, the object 212, or the vehicle 102. To understand a reason for selection of the first candidate trajectory 216, the second candidate trajectory 218, or the third candidate trajectory 220 as the planned trajectory, the computing device 202 can also determine metadata describing the environment 200, the object 212, or the vehicle 102.

In various examples, the planning component 104 can implement the map generation component 204 to generate discretized representations (e.g., one or more heat maps, vector maps, etc.) based on sensor data and feature data. In the example depicted in FIG. 2, the feature data can comprise data associated with a lane change for crossing the lane boundary 222. In some examples, the map generator 204 can determine one or more heat maps using techniques similar to those described in relation to FIG. 1 such as associating cells of the heat map(s) to represent costs for crossing the lane boundary 222.

The cost determination component 206 can determine one or more costs for a heat map or other discretized representation. In the example of FIG. 2, cost determination component 206 can determine lane change cost(s) for the vehicle 102 to change lanes and pass over the lane boundary 222. The one or more costs can be assigned or otherwise associated with cells of the heat map(s). For instance, a cost value may increase as the vehicle 102 approaches the lane boundary, and lower as the vehicle 102 is further from the lane boundary 222. In this way, lane change costs can be considered when the planning component 104 determines the output data 108 for passing the lane boundary 222. Generally, the one or more heat maps can represent one or more costs that take into account statics, dynamics, kinematics, and so on, associated with potential interactions between the vehicle 102 and moving or non-moving objects.

Some example costs include: a follow cost, a lane change cost, a blinker cost, a progress cost, a safety cost, an obstacle cost, an interaction cost, an active object cost (e.g., a cost for the object to avoid the vehicle 102), an inactive object cost, a pedestrian cost, previous vehicle state cost, sensor error cost (e.g., error in pose and/or localization), an animal cost, a bicyclist cost, a light indicator cost (e.g., a taillight or other light of the vehicle or another object), a road network cost, and the like. Any of the above example costs can therefore be encoded into the one or more heat maps (e.g., the heat map can account for sensor error, inactive objects like traffic cones, street signs, buildings, etc. as well as how much effort an active object may take to avoid the vehicle 102.

The aggregation component 208 can aggregate or combine the discretized representations and/or the costs associated therewith. For example, the aggregation component 208 can aggregate costs for the first candidate trajectory 216, the second candidate trajectory 218, or the third candidate trajectory 220 such as in a decision tree having a branch for costs of each respective trajectory. In some examples, the combined discretized representations (e.g., heat maps) and/or costs are usable for determining a planned trajectory. For instance, the aggregation component 208 can apply a heuristic to the costs of the decision tree to determine how to search the tree for the candidate trajectory having the highest margin of safety (e.g., the lowest overall cost). In some examples, the aggregation component 208 can determine the second candidate trajectory 218 as the planned trajectory for the vehicle 102 to follow in the future based on the branch of the tree associated with the second candidate trajectory 218 having the lowest overall costs, or being less than a cost threshold. In some examples, the aggregation component 208 can modify a branch of a tree search based at least in part on the cost threshold.

In various examples, the aggregation component 208 can aggregate costs by performing a tree search representing spatial or trajectory space. A root node can represent a current position of the vehicle 102 and branches may be associated with potential candidate actions such as the aforementioned candidate trajectories. A number of branches may be determined by the aggregation component 208 based at least in part on a configurable parameter (e.g., an input indicating an amount of branches to include in the tree, such as four branches, constrained based on a scenario type (e.g., exclude actions for turning at junctions where the destination requires traversing through the junction), etc.). The branches may be associated with costs from one or more discretized representations and/or a cost(s) not associated with a discretized representation. In this way, the tree represents searchable space to predict actions usable to control the vehicle 102.

In some examples, candidate references (e.g., the candidate trajectories of FIG. 2) can be generated by the planning component 104 (or other component) for associating with a branch. In such examples, a pre-determined number of candidate references can be generated based on a number of branches that will be part of the tree which may depend on the aforementioned configurable parameter and/or available computational resources (to maximize efficiency of resources used during the tree search). In at least some such examples, varying numbers of discretized regions may be determined in accordance with an amount of compute available.

Performing the tree search can comprise aggregating costs (e.g., follow cost, lane change cost, blinker cost, progress cost, safety cost, obstacle cost, interaction cost, object cost, etc.) for a branch over time (e.g., by discretizing the branch into a series of times and evaluating an aggregate or instantaneous cost at such time steps), and determining whether to change to another branch based on an aggregated cost value for a respective branch relative to a cost threshold. For instance, when costs for the first candidate trajectory 216 exceeds the cost threshold, the tree search can change from exploring the branch associated with the first candidate trajectory 216 to another branch associated with the second candidate trajectory 218 or the third candidate trajectory 220. Changing branches may also or instead be based on comparing costs of different branches one to another and identifying a branch having a lower cost to explore. The tree search may, for example, compare aggregated cost values for each respective branch one to another and/or to a cost threshold, and determining a trajectory for the vehicle to follow based on the branch having a lowest overall cost relative to the costs of other branches. For clarity, exploring a branch can correspond to tracking a candidate trajectory over time in the future. Thus, performing a tree search can include predicting a trajectory for the vehicle by tracking actions and costs associated with following potential trajectories over a time period.

In some examples, the tree search may determine the trajectory for the vehicle by combining portions of the candidate trajectories (e.g., a piecewise summing of different potential trajectories) associated with different times in the future. For instance, for a first period of time the first candidate trajectory 216 may represent the lowest overall cost and therefore safest trajectory for the vehicle 102, however, for a second period of time the second candidate trajectory 218 may represent the lowest overall cost. In such examples, the aggregation component 208 can apply a local optimization technique (e.g., an optimization operation caused by an algorithm) to smooth a transition between branches, and portions of the different candidate trajectories can be combined to form the planned trajectory usable to control the vehicle in the future. The transition between candidate trajectories at a point in time can correspond to a time at which the tree search changes branches, for example. Accordingly, the tree search can determine costs associated with multiple potential trajectories at different times over a pre-determined time period, and determine a vehicle trajectory based on an amount of time each branch was processed, a time at which a branch change occurred, and/or costs associated with each branch.

In some examples, the aggregation component 208 can aggregate costs (e.g., an obstacle cost, a lane change cost, and so on) for each instant in time over a period of time (e.g., predicting costs 8 seconds into the future, or other duration). For instance, the aggregation component 208 may generate heat maps for four different costs (or other number of costs) every 0.5 seconds for 8 seconds such that 64 (4 costs×16 instances of time) heat maps are evaluated to determine a vehicle action.

The rationalization component 210 represents functionality to determine metadata, or interpretability data, usable to interpret why the aggregation component 208 determined or otherwise used a portion or did not use a portion of a candidate trajectory to control the vehicle 102 relative to the object 212. For example, the rationalization component 210 can identify data describing the environment 200, the vehicle 102, and the object 212 based on sensor data, map data, vehicle state data, object state data, rules of the road data describing right of way, historical data relating to changes in the vehicle state or the object state over time, etc. Generally, the metadata can be associated with one or more regions of a 2D map. In some examples, the rationalization component 210 can, in various examples, annotate the metadata with costs of the heat map(s). By annotating the metadata and the costs, the rationalization component 210 can provide one or more reasons for determining the candidate trajectory of the vehicle 102. In one specific example, the rationalization component 210 can use annotations of metadata with different costs to identify reasons why a branch of a tree search is abandoned or selected. In other words, if a cost associated with a branch is above a cost threshold, the metadata can provide reasons why the branch was abandoned.

Generally, the rationalization component 210 outputs metadata representing an intent of the vehicle and/or characteristics of the environment (e.g., what the vehicle is doing relative to the candidate trajectories). The metadata can indicate an action or behavior by the vehicle (e.g., "continue to follow vehicle", "stay in lane", etc.) along each trajectory. The metadata can also associate weather, intersection information, and/or object behavior (e.g., erratic or aggressive objects) with the costs. In various examples, the metadata can include time information (e.g., a time or time period) such that the vehicle behavior, the object behavior, and/or the trajectories are associated with time. For instance, the planning component 104 can associate the planned trajectory and/or the candidate trajectory(ies) and the metadata based on the time information.

The rationalization component 210 can, in some examples, compare costs for cells of the discretized representations. For example, a root cause for selecting or not selecting a candidate trajectory (or a portion thereof) as a planned trajectory can be based at least in part on a difference between costs associated with a selected trajectory and costs associated with a non-selected trajectory. Thus, the root cause for selecting a trajectory can be based at least in part on comparing costs between different trajectories and determining the difference between the costs and, at least in some examples, which cost(s) of the aggregate was the largest contributing factor to the final trajectory determination.

In various examples, the rationalization component 210 can output a certainty, or confidence, associated with the metadata (e.g., a 50% confidence that the vehicle is stopping or following another vehicle based on a pedestrian in a crosswalk). For example, the rationalization component 210 can determine confidence values to indicate a degree of certainty in the metadata determination (e.g., the reason(s) for selecting and/or not selecting a trajectory). Confidence values associated with the metadata can be used to improve future predictions by rationalization component 210 during training or be compared one to another to identify an overall reason for a vehicle action.

Metadata output by the rationalization component 210 can, in some examples, be determined based at least in part on data from another model or component. For example, a machine learned model can provide input data to the rationalization component 210 indicating reasons why the vehicle 102 behaves a certain way in the environment. In some examples, the machine learned model can represent another planning component running in parallel with the planning component 104, and data from the machine learned model can be processed by the rationalization component 210 to output the metadata based on determinations or predictions from the machine learned model.

The rationalization component 210 can output the metadata for presentation on a display device such as a user interface within the vehicle to present how and/or why the vehicle 102 is moving relative to characteristics of the environment (e.g., to show the planned trajectory relative to objects in the environment). Outputting the metadata for presentation on the display device may also or instead include causing presentation of the metadata on a mobile device associated with a user that hired the vehicle 102. For example, the display device may present images of another vehicle, pedestrian, etc. sensed in the vicinity of the vehicle to give the user context for current and future vehicle operations. Outputting the metadata for presentation may also include outputting audio on a device within the vehicle 102 and/or a device associated with a user.

The rationalization component 210 can also or instead output the metadata for training one or more components of a vehicle computing device. For example, a computing device can train the rationalization component 210 based at least in part on the metadata describing reasons a candidate trajectory is or is not selected (e.g., why a branch of a tree search changed, etc.). The computing device can use the metadata during training of the model to "understand" why a particular candidate trajectory (or portion thereof) was or was not determined as the planned trajectory. In some examples, human labelled training data (e.g., a description of a scene in a 3 second clip, for example) can be used to improve future metadata determinations by the rationalization component 210.

The metadata output by the rationalization component 210 may also or instead be used to improve trajectory determinations by changing (e.g., increasing or decreasing) an amount of branches used in a tree search (adjusting the configurable parameter). For instance, metadata indicating a trajectory previously used in an area with multiple pedestrians can be used to increase a number of candidate trajectories considered during a future tree search.

Additionally or alternatively, the metadata output by the rationalization component 210 may be used to modify one or more costs associated with one or more candidate trajectories. For example, the cost determination component 206 can increase or decrease one or more costs based on the metadata explaining why a previous trajectory was or was not used. In one specific example, the pedestrian cost and/or progress cost can be adjusted higher based on the metadata indicating that an area is typically associated with multiple pedestrians. Accordingly, the cost determination component 206 can improve cost determinations (e.g. provide more accurate costs) over time based on being trained using metadata thereby improving vehicle safety as the vehicle navigates.

In some examples, the computing device 202 can store metadata in a database, memory, or other storage location. For example, the rationalization component 210 can log the metadata (e.g. record data over time) for later use. Metadata describing different scenarios in an environment can include time information to associate the metadata with actions by the vehicle 102 or other objects. In various examples, logging the metadata can occur as the vehicle 102 navigates in the environment.

In some examples, the rationalization component 210 can output metadata to one or more components of a vehicle computing device including a planning component of the vehicle 102 (e.g., the planning component 426 of FIG. 4) to enable the planning component to improve, verify, or reinforce determinations or decisions. For example, if the planning component decides to turn left and activate a blinker, the planning component can use the metadata to cause consistent future planning determinations at similar left turns (or other vehicle action). Of course, other components of the vehicle computing device may also or instead use the metadata to improve decisions (e.g., improve sensor calibration, vehicle localization, and so on.

Figure 3:
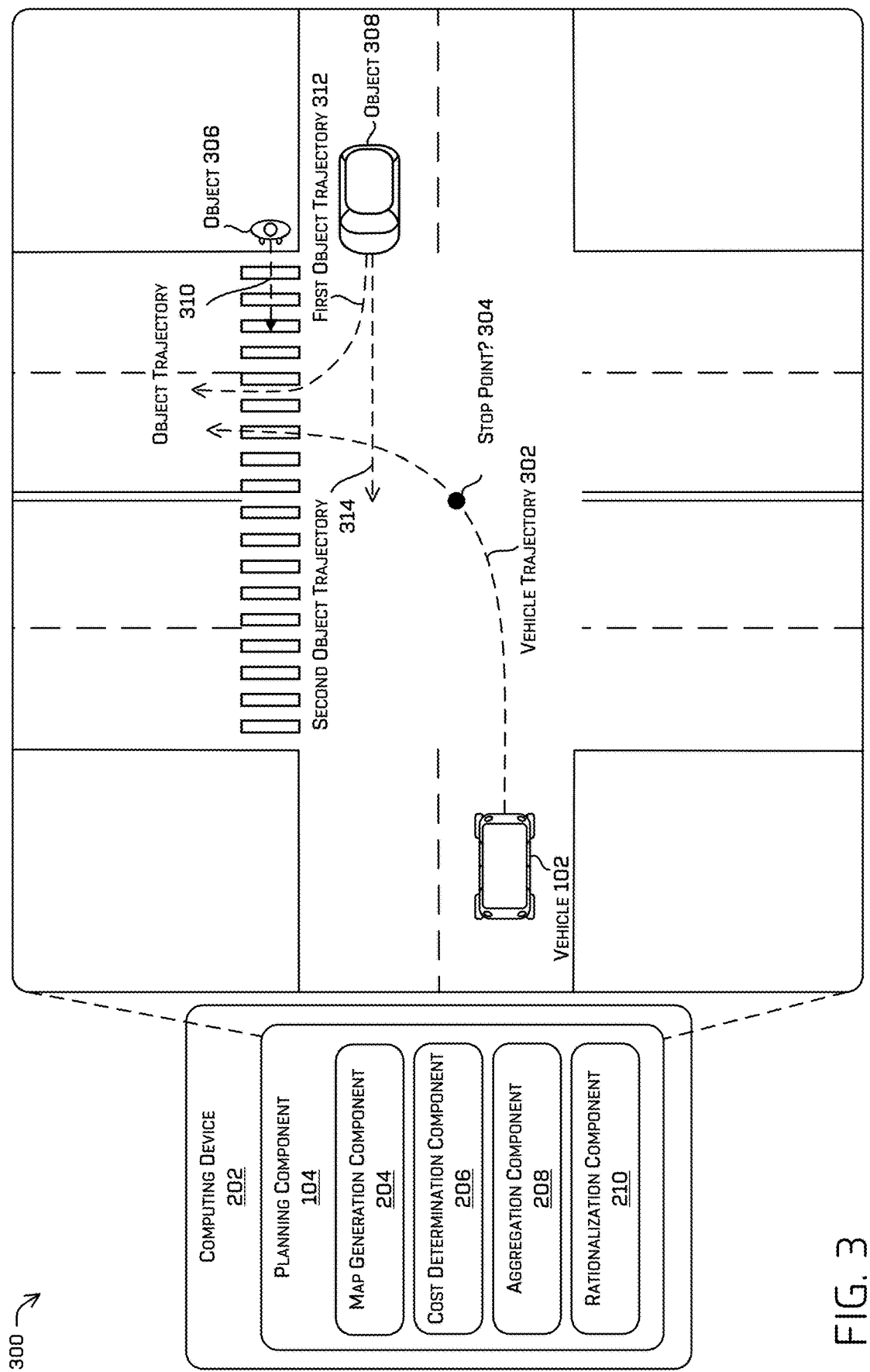
FIG. 3 is an illustration of another example environment, in which an example vehicle applies a planning component to predict a vehicle trajectory.

FIG. 3 is an illustration of another example environment 300, in which an example vehicle (vehicle 102) applies a planning component (the planning component 104) to predict a vehicle trajectory. The environment 300 includes the computing device 202, however in other examples the techniques described in the environment 300 may be performed by the vehicle computing device 404 and/or the computing device(s) 436.

As depicted in FIG. 3, the planning component 104 comprises the map generation component 204, the cost determination component 206, the aggregation component 208, and the rationalization component 210 to predict a vehicle trajectory 302 to enable the vehicle 102 to turn at an intersection (e.g., an unprotected left turn). For instance, the planning component 104 can receive the input data 106 and determine whether the vehicle should stop at a stop point 304 along the vehicle trajectory 302 to allow the object 306 (a pedestrian) and/or the object 308 (another vehicle) to safely pass. For instance, the planning component 104 can predict whether to stop at or near the stop point 304 based on determining an object trajectory 310 for the pedestrian 306 and a first object trajectory 312 and second object trajectory 314 for the vehicle 308. The first object trajectory 312 (to turn right) and the second object trajectory 314 (to go straight) represent two potential trajectories for the vehicle 308 to follow at a future time. In other examples, the planning component 104 can determine any number of object trajectories for each object in the environment 300.

The planning component 104 can implement the map generation component 204 to determine heat maps for different areas along the vehicle trajectory 302 including an area in front of the pedestrian 306 and another area in front of the vehicle 308. In some examples, the map generation component 204 to determine the heat maps based on sensor data, map data, state data, and/or feature data. In the environment 300, the map generation component 204 can generate a heat map based on feature data associated with an intersection, a left-turn, a crosswalk, an oncoming object, and so on. The cost determination component 206 can determine costs for each of the heat maps, and the aggregation component 208 can combine the costs to determine whether to brake, slow and not stop, stop, or accelerate at the stop point 304.

The rationalization component 210 can generate metadata describing the environment 200 as an uncontrolled intersection, an intersection with traffic signals, and so on. The metadata can also describe the vehicle 102 as turning left with potential intersection points with the pedestrian 306 and the vehicle 308 depending on a speed associated with the object trajectory 310, a speed associated with the first object trajectory 312, and a speed associated with the second object trajectory 314.

Figure 4:
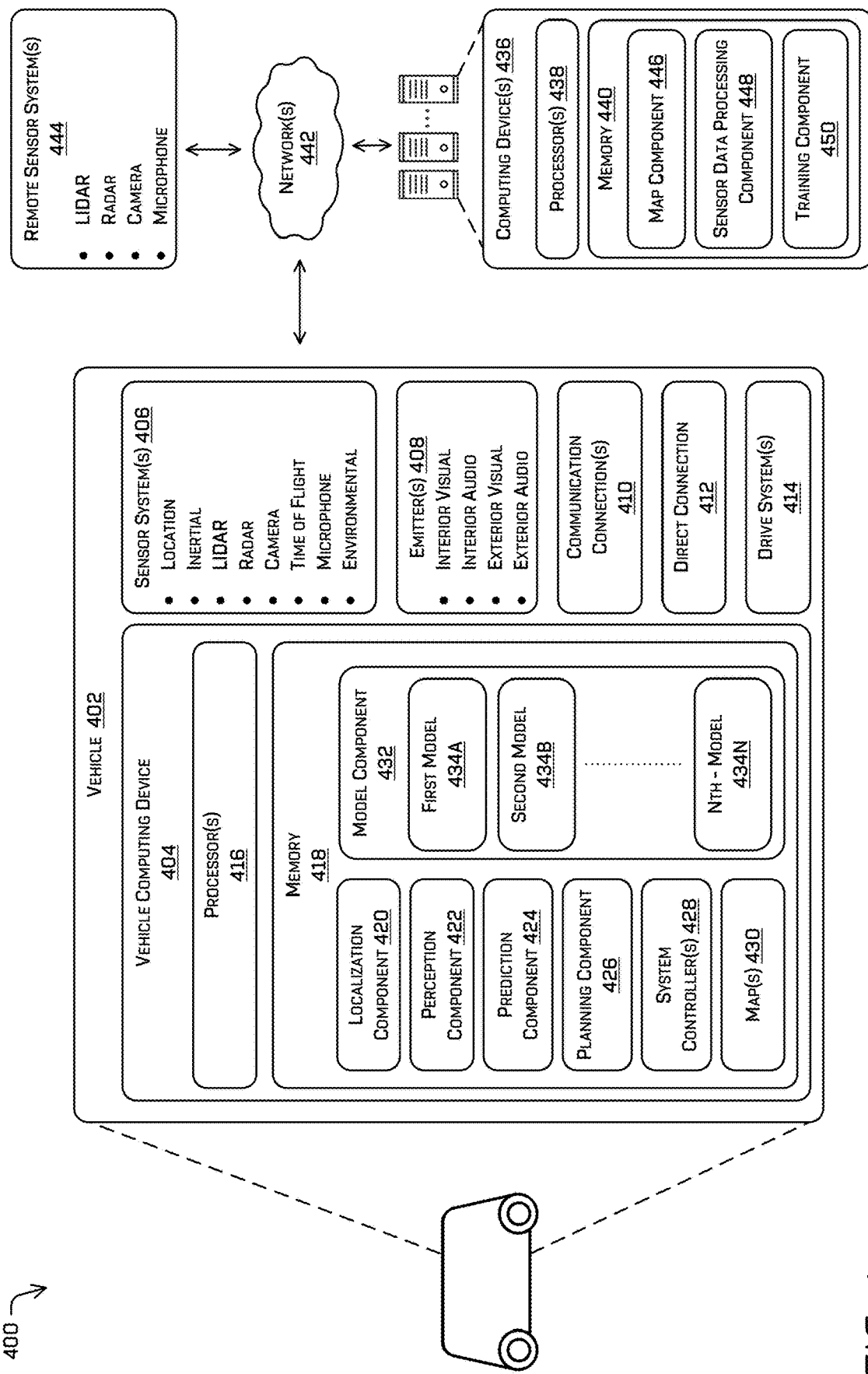
FIG. 4 is a block diagram of an example system for implementing the techniques described herein.

FIG. 4 illustrates a block diagram of an example system 400 for implementing the techniques described herein. In at least one example, the system 400 can include a vehicle 402, which can be the same vehicle as the vehicle 102 described above with reference to FIG. 1.

The vehicle 402 may include a vehicle computing device 404 (e.g., one or more devices), one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device 404 may store sensor data associated with actual location of an object at the end of the set of estimated states (e.g., end of the period of time) and may use this data as training data to train one or more models. In some examples, the vehicle computing device 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states. Additional details of training a machine learned model based on stored sensor data by minimizing differences between actual and predicted positions and/or predicted trajectories is described in U.S. patent application Ser. No. 16/282,201, filed on Mar. 12, 2019, entitled "Motion Prediction Based on Appearance," which is incorporated herein by reference for all purposes.

In the illustrated example, the memory 418 of the vehicle computing device 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, LIDAR data, RADAR data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In implementations, the perception component 422 can specifically identify articulated objects, such as articulated vehicles. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for articulated objects, vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., articulated objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can determine a trajectory for the vehicle 402 (e.g., a planned trajectory) based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from the planning component 104 as described in FIGS. 1-3 and elsewhere.

In at least one example, the vehicle computing device 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device 404 may include a model component 432. The model component 432 may be configured to perform the functionality of the planning component 104 including predicting trajectories for the vehicle 402, objects (the objects 110, 112, 212, 306, and 308), and metadata. In various examples, the model component 432 may receive one or more features associated with the detected obj ect(s) from the perception component 422 and/or from the sensor system(s) 406. For instance, the model component 432 can receive data, e.g., sensor data, feature data, etc. associated with the vehicle 402, an environment, and/or objects in the environment. The feature data may represent a region in the environment and/or a control policy for the vehicle (e.g., stay in lane, change lane, operate blinker, brake, accelerate, and so on). In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the vehicle (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine whether an object intersects with the vehicle 402 based at least in part on the one or more actions for the vehicle 402. In some examples, the model component 432 may be configured to determine the actions that are applicable to the environment, such as based on environment characteristics, weather characteristics, or the like.

The model component 432 may generate sets of estimated states of the vehicle and one or more detected objects forward in the environment over a time period. The model component 432 may generate a set of estimated states for each action (e.g., reference action and/or sub-action) applicable to the environment. The sets of estimated states may include one or more estimated states, each estimated state including an estimated position of the vehicle and an estimated position of a detected object(s). In some examples, the estimated states may include estimated positions of the detected objects at an initial time (T=0) (e.g., current time).

The model component 432 may determine the estimated positions based on a detected trajectory and/or predicted trajectories associated with the object. In some examples, determining the estimated positions may be based on an assumption of substantially constant velocity and/or substantially constant trajectory (e.g., little to no lateral movement of the object). In some examples, the estimated positions (and/or potential trajectories) may be based on passive and/or active prediction. In some examples, the model component 432 may utilize physics and/or geometry-based techniques, machine learning, linear temporal logic, tree search methods, heat maps, and/or other techniques for determining predicted trajectories and/or estimated positions of objects.

In various examples, the estimated states may be generated periodically throughout the time period. For example, the model component 432 may generate estimated states at 0.1 second intervals throughout the time period. For another example, the model component 432 may generate estimated states at 0.05 second intervals. The estimated states may be used by the planning component 426 in determining an action for the vehicle 402 to take in an environment.

In various examples, the model component 432 may utilize machine learned techniques to predict risks associated with evaluated trajectories. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine an object velocity or acceleration for predicting potential intersection(s) between objects and/or between the vehicle 402 and one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss oftraction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may generate maps of various resolutions. In such examples, the map component 446 may send one or more maps to the vehicle computing device 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device 404, such as for use by the model component 432 (e.g., the model(s) 434). In some examples, the sensor data processing component 448 may be configured to send raw sensor data to the vehicle computing device 404.

In some instances, the training component 450 can train a machine learning model to output articulated object trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can train a machine learning model to output trajectory values, metadata, and the like. For example, the training component 450 can receive data that represents labelled collision data (e.g., publicly available data, sensor data, and/or a combination thereof), trajectory data, metadata, and so on. At least a portion of the data can be used as an input to train the machine learning model. Thus, by providing data where the vehicle traverses an environment, the training component 450 can be trained to output vehicle trajectories to avoid potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5A:
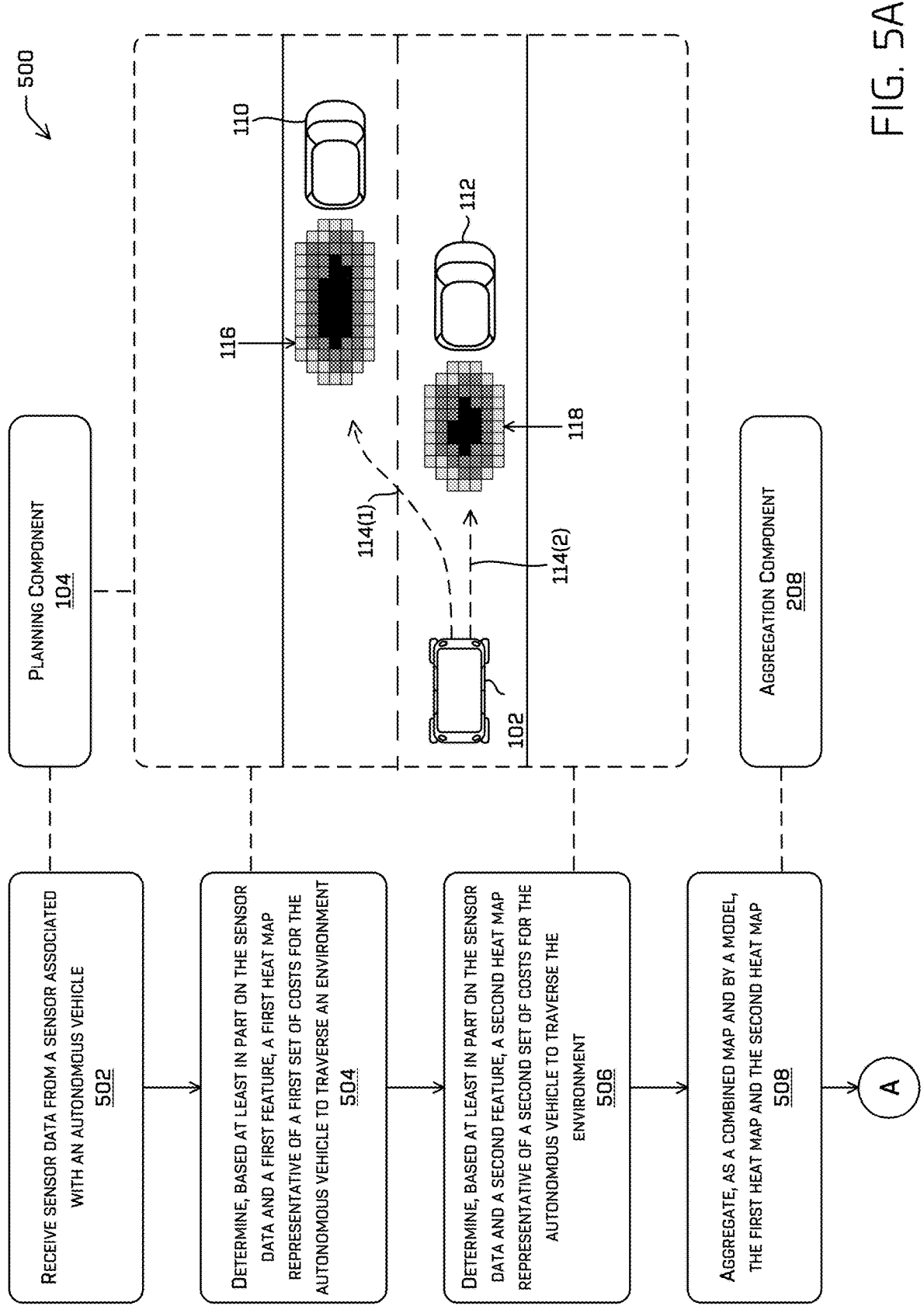
FIG. 5A is a first part of a flowchart depicting an example process for determining a vehicle trajectory and metadata using one or more example models.
Figure 5B:
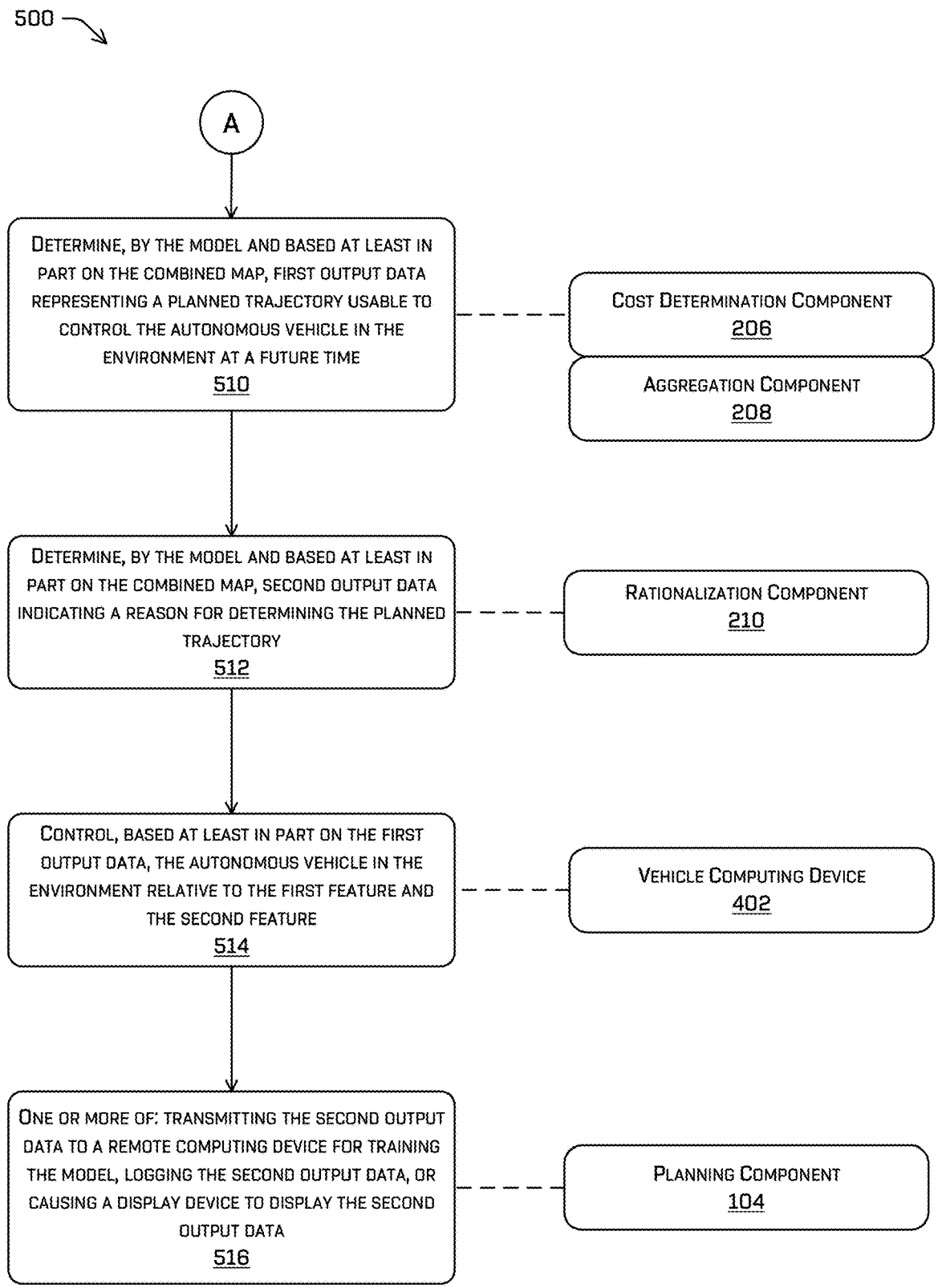
FIG. 5B is a second part of the flowchart depicting the example process for determining a vehicle trajectory and metadata using one or more example models.

FIGS. 5A and 5B illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

FIG. 5A is a first part of a flowchart depicting an example process 500 for determining a vehicle trajectory and metadata using one or more example models. For example, some or all of the process 500 can be performed by one or more components in FIGS. 1-4, as described herein. For example, some or all of the process 500 can be performed by the vehicle computing device 404, the computing device(s) 436, or the computing device 202. However, the process 500 is not limited to being performed by these components, and the components are not limited to performing the process 500.

At operation 502, the process 500 can include receiving sensor data from a sensor associated with an autonomous vehicle. In some examples, the operation 502 may include the planning component 104 of a vehicle computing device receiving sensor data from a lidar sensor, a radar sensor, and so on, associated with the vehicle 402. In some examples, the sensor data represents objects detected the environment, such as the object 110 and the object 112. The sensor data may be received from one or more sensors on the vehicle and/or from one or more remote sensors (e.g., a sensor in the environment and/or a sensor on another vehicle).

At operation 504, the process may include determining, based at least in part on the sensor data and a first feature, a first heat map representative of a first set of costs for the autonomous vehicle to traverse an environment. In some examples, the operation 504 may include a vehicle computing device generating, estimating, or otherwise determining a heat map (e.g., a two-dimensional data representation of the environment comprising cells that represent a set of costs such as the discrete representation 116). In various examples, the map generation component 204 can receive feature data representing a region behind the object 110. The first set of costs can include a following cost, a lane change cost, a signal cost, and/or a braking cost, just to name a few.

At operation 506, the process may include determining, based at least in part on the sensor data and a second feature, a second heat map representative of a second set of costs for the autonomous vehicle to traverse the environment. In some examples, the operation 506 may include the map generation component 204 generating, estimating, or otherwise determining an additional heat map for a region behind the object 112 (e.g., the discrete representation 118) based on feature data associated with the object 112. The operation 506 may include, for example, a vehicle computing device implementing the cost determination component 206 to determine costs associated with one or more heat maps.

At operation 508, the process may include aggregating, as a combined map and by a model, the first heat map and the second heat map. In some examples, the operation 508 may include the aggregate component 208 combining the first heat map and the second heat map (and the costs associated with therewith). For instance, the aggregate component 208 can combine the discrete representation 116 and the discrete representation 118 as a combined heat map for use by the vehicle computing device. The operation 508 may include, for example, the vehicle computing device implementing the aggregate component 208 to aggregate costs of the first heat map and the second heat map based at least in part on performing a tree search.

FIG. 5B is a second part of the flowchart depicting the example process 500 for determining a vehicle trajectory and metadata using one or more example models.

At operation 510, the process may include determining, by the model and based at least in part on the combined map, first output data representing a planned trajectory usable to control the autonomous vehicle in the environment at a future time. In some examples, the operation 510 may include a vehicle computing device implementing the cost determination component 206 and/or the aggregate component 208 to determine the planned trajectory based at least in part on aggregated costs associated with the combined map. In such examples, the vehicle computing device can determine which portions of the first candidate trajectory 114(1) or the second candidate trajectory 114(2) to include as the planned trajectory based at least in part on the costs associated with the heat maps. For instance, the costs of cells that intersect with the first candidate trajectory 114(1) or costs of cells that intersect with the second candidate trajectory 114(2) can be combined and compared to a cost threshold, or compared to each another, to identify which cells have a lower overall cost. In some examples, the planned trajectory can be based at least in part on a heuristic.

At operation 512, the process may include determining, by the model and based at least in part on the combined map, second output data indicating a reason for determining the planned trajectory. In some examples, the operation 512 may include the vehicle computing device implementing the rationalization component 210 to determine metadata describing the environment, the vehicle 402, and the objects 110 and 112. For example, the rationalization component 210 can determine what is occurring to cause selection of a candidate trajectory as the planned trajectory. Though the costs are used to determine the planned trajectory, the costs may not indicate why a candidate trajectory is safer than another (e.g., more likely to avoid intersecting with the objects 110 and 112). Further, because a heuristic may be used to determine the planned trajectory as part of the tree search, the planned trajectory may be based on data that does not correlate to a vehicle behavior. Thus, the metadata can provide an indication for selection of the planned trajectory.

At operation 514, the process may include controlling, based at least in part on the first output data, the autonomous vehicle in the environment relative to the first feature and the second feature. In some examples, the operation 514 may include the controlling the vehicle 402 based on the planned trajectory. In some examples, the operation 512 may include controlling a braking system, an acceleration system, a steering system, s drive system, etc. of the vehicle 402 according to (e.g., follow) the planned trajectory.

At operation 516, the process may include one or more of: transmitting the second output data to a remote computing device for training the model, logging the second output data, or causing a display device to display the second output data. In some examples, the operation 516 may include the planning component 104 outputting the metadata for presentation on a user interface in a passenger area of the vehicle 402 to provide an indication of motion or actions by the vehicle 402. The metadata may also or instead be displayed on a computing device associated with a passenger. In some examples, the operation 516 may also, or instead, sending the second output data to the computing device(s) 436 for training one or more models implemented by the planning component 104. For example, the metadata can be used for improving future predictions by the one or more models. Additionally or alternatively, the operation 516 may include logging the second output data for debugging, training, or other purposes. For example, the metadata may be logged in a database or memory for analysis by a human and/or a computing device.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data from a sensor associated with an autonomous vehicle; determining, based at least in part on the sensor data and a first feature, a first heat map representative of a first set of costs for the autonomous vehicle to traverse an environment; determining, based at least in part on the sensor data and a second feature, a second heat map representative of a second set of costs for the autonomous vehicle to traverse the environment; aggregating, as a combined map and by a model, the first heat map and the second heat map; determining, by the model and based at least in part on the combined map, first output data representing a planned trajectory usable to control the autonomous vehicle in the environment at a future time; determining, by the model and based at least in part on the combined map, second output data indicating a reason for determining the planned trajectory; controlling, based at least in part on the first output data, the autonomous vehicle in the environment relative to the first feature and the second feature; and one or more of: transmitting the second output data to a remote computing device for training the model, logging the second output data, or causing a display device to display the second output data.

B: The system of paragraph A, wherein: the first feature or the second feature includes one of: a vehicle state, vehicle safety, a following another object feature, a lane change feature, or a blinker operation feature associated with the autonomous vehicle.

C: The system of either paragraph A or B, wherein the second output data comprises a confidence value associated with the first feature or the second feature.

D: The system of any one of paragraphs A-C, the operations further comprising: determining that a cost of the first set of costs is above a cost threshold; and modifying a branch of a tree search based at least in part on the cost being above the cost threshold, wherein determining the first output data representing the planned trajectory is further based at least in part on modifying the branch of the tree search.

E: The system of any one of paragraphs A-D, wherein the model is a first model, and the operations further comprising: inputting the sensor data into a second model; determining, by the second model, third output data representing a behavior of the autonomous vehicle in the environment at the future time; and at least one of: training the first model based at least in part on a comparison between the third output data and the second output data; or verifying accuracy of the reason associated with the second output data based at least in part on the third output data.

F: A method comprising: receiving sensor data from a sensor associated with an autonomous vehicle; determining, based at least in part on the sensor data and a feature, a discretized representation of a set of costs for the autonomous vehicle to traverse an environment; determining, based at least in part on the discretized representation, first output data representing a planned trajectory usable to control the autonomous vehicle in the environment at a future time; determining second output data representing a reason for determining the planned trajectory; controlling, based at least in part on the first output data, the autonomous vehicle in the environment relative to the feature; and one or more of: outputting the second output data for presentation on a display device, transmitting the second output data to a computing device for training, or logging the second output data.

G: The method of paragraph F, wherein: the feature includes one of: a vehicle state, vehicle safety, a following another vehicle feature, a lane change feature, or a blinker operation feature associated with the autonomous vehicle.

H: The method of paragraph G, wherein: the second output data comprises a confidence value to indicate a certainty of the reason the planned trajectory was determined.

I: The method of any one of paragraphs F-H, further comprising: determining that a cost of the set of costs is above a cost threshold; and modifying a branch of a tree search based at least in part on the cost being above the cost threshold, wherein determining the first output data representing the planned trajectory is further based at least in part on modifying the branch of the tree search.

J: The method of any one of paragraphs F-I, wherein a first model determines the first output data, and further comprising: inputting the sensor data into a second model; determining, by the second model, third output data representing a behavior of the autonomous vehicle in the environment at the future time; and at least one of: training the first model based at least in part on a comparison between the third output data and the second output data; or verifying accuracy of the second output data based at least in part on the third output data.

K: The method of any one of paragraphs F—J, further comprising: determining, based at least in part on the first output data, a weak classifier label to train a machine learned model, the weak classifier label classifying an aspect of vehicle behavior as good or bad; and training the machine learned model based at least in part on the weak classifier label to determine whether the vehicle behavior associated with the planned trajectory is good or bad.

L: The method of any one of paragraphs F-K, further comprising: applying a heuristic to combine the set of costs, wherein controlling the autonomous vehicle in the environment is further based at least in part on the heuristic.

M: The method of any one of paragraphs F-L, wherein: the set of costs comprises one or more of: a progress cost, a follow cost, a lane change cost, a blinker cost, an intersection cost, a safety cost, an active object cost, or an inactive object cost.

N: The method of any one of paragraphs F-M, wherein performing a tree search by: associating a first candidate action with a first branch and a second candidate action with a second branch; determining a first combined cost of the set of costs associated with the first candidate action and a second combined cost for the set of costs associated with the second candidate action; and changing from the first branch to the second branch based at least in part on a difference between the first combined cost and the second combined cost, wherein determining the first output data representing the planned trajectory is further based at least in part on the tree search.

O: The method of any one of paragraphs F-N, wherein first candidate action includes a first candidate trajectory and the second candidate action comprises a second candidate trajectory and determining the first output data representing the planned trajectory is further based at least in part on the first candidate trajectory and the second candidate trajectory.

P: The method of any one of paragraphs F-O, further comprising: performing a tree search by: associating a first branch with a first candidate trajectory and a second branch with a second candidate trajectory; processing the first branch and the second branch over a time period to track the first candidate trajectory and the second candidate trajectory in the future; determining a first amount of time processing the first branch and a second amount of time processing the second branch; and determining a first overall cost for costs associated with the first branch and a second overall cost for costs associated with the second branch, wherein determining the first output data representing the planned trajectory is further based at least in part on the first amount of time, the second amount of time, the first overall cost, and the second overall cost.

Q: One or more non-transitory computer-readable media storing instructions executable by one or more processors, wherein the instructions, when executed, cause the one or more processors to perform operations comprising: receiving sensor data from a sensor associated with an autonomous vehicle; determining, based at least in part on the sensor data and a feature, a discretized representation of a set of costs for the autonomous vehicle to traverse an environment; determining, based at least in part on the discretized representation, first output data representing a planned trajectory usable to control the autonomous vehicle in the environment at a future time; determining second output data representing a reason for determining the planned trajectory; controlling, based at least in part on the first output data, the autonomous vehicle in the environment relative to the feature; and one or more of: outputting the second output data for presentation on a display device, transmitting the second output data to a computing device for training, or logging the second output data.

R: The one or more non-transitory computer-readable media of paragraph Q, wherein: the feature includes one of: a vehicle state, vehicle safety, a following another vehicle feature, a lane change feature, or a blinker operation feature associated with the autonomous vehicle.

S: The one or more non-transitory computer-readable media of either paragraph Q or R, wherein: the second output data comprises a confidence value to indicate a certainty of the reason the planned trajectory was determined.

T: The one or more non-transitory computer-readable media of any one of paragraphs Q-S, further comprising: determining that a cost of the set of costs is above a cost threshold; and modifying a branch of a tree search based at least in part on the cost being above the cost threshold, wherein determining the first output data representing the planned trajectory is further based at least in part on modifying the branch of the tree search.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
      receiving sensor data from a sensor associated with an autonomous vehicle;
      determining, based at least in part on the sensor data and a first feature, a first heat map representative of a first set of costs for the autonomous vehicle to traverse an environment;
      determining, based at least in part on the sensor data and a second feature, a second heat map representative of a second set of costs for the autonomous vehicle to traverse the environment;
      aggregating, as a combined map and by a model, the first heat map and the second heat map;
      determining, by the model and based at least in part on the combined map, first output data representing a planned trajectory usable to control the autonomous vehicle in the environment at a future time;
      determining, by the model and based at least in part on the combined map, second output data indicating a reason for the model determining the first output data representing the planned trajectory;
      controlling, based at least in part on the first output data, the autonomous vehicle in the environment relative to the first feature and the second feature; and
      one or more of: transmitting the second output data to a remote computing device for training the model, logging the second output data, or causing a display device to display the second output data.

2. The system of claim 1, wherein:
   the first feature or the second feature includes one of: a vehicle state, vehicle safety, a following another object feature, a lane change feature, or a blinker operation feature associated with the autonomous vehicle.

3. The system of claim 1, wherein the second output data comprises a confidence value associated with the first feature or the second feature.

4. The system of claim 1, the operations further comprising:
   determining that a cost of the first set of costs is above a cost threshold; and
   modifying a branch of a tree search based at least in part on the cost being above the cost threshold,
   wherein determining the first output data representing the planned trajectory is further based at least in part on modifying the branch of the tree search.

5. The system of claim 1, wherein the model is a first model, and the operations further comprising:
   inputting the sensor data into a second model;
   determining, by the second model, third output data representing a behavior of the autonomous vehicle in the environment at the future time; and
   at least one of:
      training the first model based at least in part on a comparison between the third output data and the second output data; or
      verifying accuracy of the reason associated with the second output data based at least in part on the third output data.

6. A method comprising:
   receiving sensor data from a sensor associated with an autonomous vehicle;
   determining, based at least in part on the sensor data and a feature, a discretized representation of a set of costs for the autonomous vehicle to traverse an environment;
   determining, based at least in part on the discretized representation, first output data representing a planned trajectory usable to control the autonomous vehicle in the environment at a future time;
   determining, based at least in part on the discretized representation, second output data representing a reason for determining the first output data representing the planned trajectory;
   controlling, based at least in part on the first output data, the autonomous vehicle in the environment relative to the feature; and
   one or more of: outputting the second output data for presentation on a display device, transmitting the second output data to a computing device for training, or logging the second output data.

7. The method of claim 6, wherein:
   the feature includes one of: a vehicle state, vehicle safety, a following another vehicle feature, a lane change feature, or a blinker operation feature associated with the autonomous vehicle.

8. The method of claim 7, wherein:
   the second output data comprises a confidence value to indicate a certainty of the reason the planned trajectory was determined.

9. The method of claim 6, further comprising:
   determining that a cost of the set of costs is above a cost threshold; and
   modifying a branch of a tree search based at least in part on the cost being above the cost threshold,
   wherein determining the first output data representing the planned trajectory is further based at least in part on modifying the branch of the tree search.

10. The method of claim 6, wherein a first model determines the first output data, and further comprising:
inputting the sensor data into a second model;
determining, by the second model, third output data representing a behavior of the autonomous vehicle in the environment at the future time; and
at least one of:
training the first model based at least in part on a comparison between the third output data and the second output data; or
verifying accuracy of the second output data based at least in part on the third output data.

11. The method of claim 6, further comprising:
determining, based at least in part on the first output data, a weak classifier label to train a machine learned model, the weak classifier label classifying an aspect of vehicle behavior as good or bad; and
training the machine learned model based at least in part on the weak classifier label to determine whether the vehicle behavior associated with the planned trajectory is good or bad.

12. The method of claim 6, further comprising:
applying a heuristic to combine the set of costs,
wherein controlling the autonomous vehicle in the environment is further based at least in part on the heuristic.

13. The method of claim 6, wherein:
the set of costs comprises one or more of: a progress cost, a follow cost, a lane change cost, a blinker cost, an intersection cost, a safety cost, an active object cost, or an inactive object cost.

14. The method of claim 6, wherein
performing a tree search by:
associating a first candidate action with a first branch and a second candidate action with a second branch;
determining a first combined cost of the set of costs associated with the first candidate action and a second combined cost for the set of costs associated with the second candidate action; and
changing from the first branch to the second branch based at least in part on a difference between the first combined cost and the second combined cost,
wherein determining the first output data representing the planned trajectory is further based at least in part on the tree search.

15. The method of claim 14, wherein first candidate action includes a first candidate trajectory and the second candidate action comprises a second candidate trajectory and determining the first output data representing the planned trajectory is further based at least in part on the first candidate trajectory and the second candidate trajectory.

16. The method of claim 6, further comprising:
performing a tree search by:
associating a first branch with a first candidate trajectory and a second branch with a second candidate trajectory;
processing the first branch and the second branch over a time period to track the first candidate trajectory and the second candidate trajectory over time;
determining a first amount of time processing the first branch and a second amount of time processing the second branch; and
determining a first overall cost for costs associated with the first branch and a second overall cost for costs associated with the second branch,
wherein determining the first output data representing the planned trajectory is further based at least in part on the first amount of time, the second amount of time, the first overall cost, and the second overall cost.

17. One or more non transitory computer readable media storing instructions executable by one or more processors, wherein the instructions, when executed, cause the one or more processors to perform operations comprising:
receiving sensor data from a sensor associated with an autonomous vehicle;
determining, based at least in part on the sensor data and a feature, a discretized representation of a set of costs for the autonomous vehicle to traverse an environment;
determining, based at least in part on the discretized representation, first output data representing a planned trajectory usable to control the autonomous vehicle in the environment at a future time;
determining, based at least in part on the discretized representation, second output data representing a reason for determining the first output data representing the planned trajectory;
controlling, based at least in part on the first output data, the autonomous vehicle in the environment relative to the feature; and
one or more of: outputting the second output data for presentation on a display device, transmitting the second output data to a computing device for training, or logging the second output data.

18. The one or more non transitory computer readable media of claim 17, wherein:
the feature includes one of: a vehicle state, vehicle safety, a following another vehicle feature, a lane change feature, or a blinker operation feature associated with the autonomous vehicle.

19. The one or more non transitory computer readable media of claim 17, wherein:
the second output data comprises a confidence value to indicate a certainty of the reason the planned trajectory was determined.

20. The one or more non transitory computer readable media of claim 17, further comprising:
determining that a cost of the set of costs is above a cost threshold; and
modifying a branch of a tree search based at least in part on the cost being above the cost threshold,
wherein determining the first output data representing the planned trajectory is further based at least in part on modifying the branch of the tree search.

* * * * *